United States Patent [19]

Dubin

[11] Patent Number: 4,676,910
[45] Date of Patent: Jun. 30, 1987

[54] MEANS OF CONTROLLING PRECIPITATION OF $NA_2SO_4$ FROM SOLUTIONS OF $NAHSO_3$ OXYGEN SCAVENGERS

[75] Inventor: Leonard Dubin, Skokie, Ill.

[73] Assignee: Nalco Chemical Company, Naperville, Ill.

[21] Appl. No.: 895,079

[22] Filed: Aug. 11, 1986

[51] Int. Cl.$^4$ ................................................ C02F 5/08
[52] U.S. Cl. .................................... 210/696; 210/750; 210/757; 252/188.28; 422/12; 422/19
[58] Field of Search ............... 210/696, 749, 750, 757; 252/175, 188.28; 422/12, 14, 19

[56] References Cited

U.S. PATENT DOCUMENTS

| | | | |
|---|---|---|---|
| 2,476,598 | 7/1949 | Hall | 210/696 |
| 2,825,651 | 3/1958 | Loo et al. | 252/188.28 |
| 3,625,888 | 11/1971 | Redmore et al. | 252/188.28 |
| 3,899,293 | 8/1975 | Bush | 422/15 |
| 4,231,894 | 11/1984 | Lavin et al. | 422/15 |

Primary Examiner—Peter Hruskoci
Assistant Examiner—Coreen Lee
Attorney, Agent, or Firm—John G. Premo; Donald G. Epple; Anthony L. Cupoli

[57] ABSTRACT

Concentrated solutions of sodium sulfite and related compounds can be inhibited against sodium sulfate precipitation by substituting potassium for a portion of the sodium contained in such compounds. A typical concentrate would contain a water-soluble sulfite mixture comprising sodium and potassium sulfite with the sodium to potassium ratio ranging between 1:1 to 15:1.

3 Claims, No Drawings

MEANS OF CONTROLLING PRECIPITATION OF NA₂SO₄ FROM SOLUTIONS OF NAHSO₃ OXYGEN SCAVENGERS

INTRODUCTION

It is known to use oxygen-scavenging chemicals to treat boiler feed waters to remove therefrom any residual dissolved oxygen which, if not so removed, causes severe corrosion problems within the boiler units. Many different kinds of oxygen-scavenging formulations are available and are used primarily depending on the purpose of the steam generation within the boiler, economics of use, and/or efficiency of oxygen removal, boiler operating pressures and temperatures, or mixtures of these various reasons.

One of the lesser expensive chemical formulations used to scavenge oxygen from boiler feed waters and from other industrial waters which require low concentrations of dissolved oxygen use oxygen-scavenging formulations containing sulfur-based reducing agents, such as sodium sulfites, sodium bisulfites, metabisulfites, hydrobisulfites, mixtures thereof, or mixtures with other oxygen scavengers such as hydrazine, carbohydrazide, erythorbic acid, ascorbic acid, and the like. The sulfite or sodium bisulfite sulfur-based reducing agents are inexpensive, easily used, and can derive economically superior results in certain circumstances, and can be used as is or with various catalytic agents, such as transition metal salts, particularly cobalt salts.

When these aqueous oxygen scavenger formulations are used industrially, they contain, for the most part, sulfur-based reducing agents chosen from the group consisting of sodium sulfite, sodium bisulfite, sodium metabisulfite, and mixtures thereof. These aqueous oxygen scavenger formulations containing the previously mentioned sulfur-based reducing agents may additionally contain transition metal catalysts, such as cobalt salts, and are normally prepared at concentrations ranging between about 10 to about 40 weight percent active reducing agent.

At these concentrations, depending upon temperature, time, perhaps pH, and other conditions, for example, catalyst concentrations and type, these sulfite or bisulfite systems can undergo disproportionation reactions which are demonstrated by the following equation:

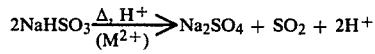

In fact, certain industrial formulations originally formulated to contain about 39 weight percent sodium bisulfite have been found in storage facilities some 2–6 months after original formulation to contain only about 13 weight percent active sodium bisulfite and saturation levels of sodium sulfate salts. Additionally, these storage levels of sodium sulfate and production of sulfur dioxide via the disproportionation reaction can provide reactants which can provide raw materials for the following reactions:

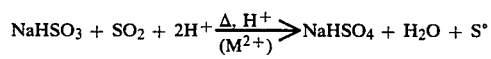

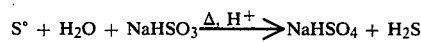

Summary $4NaHSO_3 \longrightarrow 2NaHSO_4 + Na_2SO_4 + H_2S$

As a result of the reactions above, and/or other unidentified reactions, it is likely to find sodium sulfate precipitates and sulfur precipitates within storage tanks, feed lines, pumps, valves, and feed quills used to store and to add these oxygen-scavenging formulations to the industrial water system requiring low values of dissolved oxygen, such as boiler systems. The formation of these sodium sulfate salt precipitates cause blockage within the feeding system and can cause corrosion and other difficulties within the storage and feeding systems used to contain these sulfur-based reducing agent oxygen scavengers.

It would, therefore, be an advance in the art if one could inhibit the formation of sodium sulfate and/or inhibit the precipitation of sodium sulfate within these storage systems, feed lines, valves, and feed quills. It is an object of this invention to inhibit the formation of sodium sulfate precipitates in storage tanks, feed lines, and the like, used to contain and/or feed aqueous oxygen scavenger formulations based on sulfur-containing reducing agents, such as sodium sulfite, sodium bisulfite, metabisulfite, hydrobisulfite, and the like.

THE INVENTION

I have determined a method of inhibiting sodium sulfate precipitates in storage tanks, feed lines, pumps, valves, and feeding quills, exposed to aqueous oxygen scavenger formulations containing sulfur-based reducing agents chosen from the group consisting of sodium sulfite, sodium bisulfite, sodium metabisulfite, sodium hydrosulfite, and mixtures thereof, which comprises adding, in place of a portion of the sodium values present in said oxygen scavenger formulations, an effective amount of potassium values for the purpose of inhibiting sodium sulfate precipitation.

An effective amount of potassium values occurs when the sodium-to-potassium mole ratio ranges between about 1:1 to about 15:1, and preferably when the sodium-to-potassium mole ratio ranges between about 7:1 to about 12:1; most preferably, when the sodium-to-potassium mole ratio is between about 8:1 to about 10:1.

The oxygen-scavenging formulations containing sulfur-based reducing agents may be free of transition metal catalysts or may contain catalytically effective amounts of various transition metals, such as cobalt, molybdenum, nickel, and the like. When these oxygen-scavenging formulations contain such catalytic metals as water-soluble transition metal salts, additional problems can be created which lead to precipitation of these transition metal salts within the storage and feeding systems described above. For example, when a water-soluble cobalt salt is formulated with sodium bisulfite oxygen-scavenging formulations, it has been determined that cobalt sulfates, cobalt sulfites, and like cobalt precipitates can occur in certain parts of the storage and feeding system, particularly those portions of this system which are exposed to high operating temperatures, for example, the feeding quills in the boiler water treatment system.

It has also been found that when these sulfur-based reducing agent oxygen-scavenging formulations contain such catalytically effective amounts of cobalt salts, they must also be formulated not only replacing certain of the sodium values with potassium values, but also in aqueous formulations having a pH ranging between about 3.0 to about 5.0, preferably between 3.5 to about 4.5, and most preferably between about 3.6 to about 4.0. If cobalt is not present, higher pH values can be used. However, lower pH's are not acceptable because acidity will accelerate the $NaHSO_3$ disproportionation RX to form $Na_2SO_4$.

To demonstrate the effectiveness of replacing with potassium values certain portions of the sodium values normally present in water-based oxygen-scavenging formulations containing the sulfur-based reducing agents mentioned above, the following test results have been obtained:

EXPERIMENTAL

A standard 35 percent sodium bisulfite formulation containing cobalt (II) water-soluble salts for the purposes of catalyzing oxygen-scavenging was modified with varying amounts of potassium bifulfite. The standard cobalt (II) catalyzed 35 percent sodium bisulfite formulations and the potassium modified bisulfite formulations, having a mole ratio of sodium to potassium of 8.5:1, were placed in pressure bombs (50 ml. of each formulation per bomb), and the bombs placed in an oven heated to 285° C., which temperature was calculated to achieve an internal bomb pressure of about 1,000 psi. The pH of the standard formulation (without potassium) was initially 3.8. The pH of the sodium/potassium variant was initially 5.4.

After the test was completed, a complete analysis of sulfur compounds found precipitated in various parts of the bomb system was made. Materials found precipitated included, but were not necessarily limited to, sodium sulfate, sulfur, iron sulfides, cobalt sulfides, nickel sulfides, and the like. The iron and nickel sulfide salts were presumed to have been formed from a corrosive reaction involving the bomb alloy and hydrogen sulfide.

The analysis of the bomb compounds consisted of three analytical portions: (1) black sludge filtered from each bomb, (2) green liquor filtrate, and (3) post precipitation/secondary precipitation of white needlelike crystals that precipitated from the bomb which did not contain any potassium.

The final pH was also measured, and other observations made. The results of these tests are outlined in the following tables.

Table A is the analysis of the black sludge which is shown to be primarily heavy metal sulfides.

Table B is the analysis of the green liquor filtrate and shows that the $K^+$ modified system held in solution significantly more sulfate salts and did not cause to have any secondary $Na_2SO_4$ precipitation.

Table C shows that the secondary precipitation of white needlelike crystals from the system without potassium is pure $Na_2SO_4$ hydrates.

Table D is a summary of Tables A, B and C.

| BOMB PRECIPITATE ANALYSIS | | |
|---|---|---|
| | Standard | ($K^+$ Modified) |
| S ($SO_3$) | 47 | 46 |
| Ni (NiO) | 33 | 39 |
| Na ($Na_2O$) | 10 | 7 |
| Cu (CuO) | 6 | 5 |
| Cr ($Cr_2O_3$) | 2 | 1 |
| K ($K_2O$) | | 1 |
| X-ray Diffraction | $Ni_3S_2$, NiS | $Ni_3S_2$, NiS |

| BOMB LIQUOR ANALYSIS (FILTRATE) | | |
|---|---|---|
| | Standard | ($K^+$ Modified) |
| pH As Is Initial | 3.8 | 5.4 |
| pH After Expt. | 1 | 1 |
| Appearance Solution | Dark Green | Dark Green |
| % $Na^+$ | 14 | 19 |
| % $K^+$ | none | 1.7 |
| % Fe | 0.4 | 0.27 |
| % Ni | 1.0 | 3.8 |
| % Co | 160 ppm | 71 ppm |
| % S° | 6.4 | 8.1 |
| % $SO_4$ | 23 | 27 |
| Odor | $H_2S$ | $H_2S$ |
| Secondary ppt. | yes | no |

NOTE:
Mole ratio of Na/K in this bomb experiment was 8.5:1.

| CRYSTALLINE PRECIPITATE FROM STANDARD FILTRATE* | |
|---|---|
| (No Potassium) | |
| S° ($SO_3$) | 58 |
| Na ($Na_2O$) | 41 |
| Ni (NiO) | 1 |
| Fe ($Fe_2O_3$) | 1 |
| X-ray Diffraction | $Na_2SO_4$ |

*ppt not rinsed

| ANALYSIS OF LIQUOR ANALYSIS (Filtrate) | | | |
|---|---|---|---|
| | Standard 35% $NaHSO_3$ | 9:1 Mole $Na^+/K^+$ Modified 35% $NaHSO_3$ | Differences Between Standard and 9:1 mole $Na^+/K^+$ Systems Relative % |
| pH Initial | 3.8 | 5.4 | — |
| pH After Expt. | 1 | 1 | — |
| Odor After Expt. | $H_2S$ | $H_2S$ | — |
| Appearance Soln | Dark Green | Dark Green | — |
| Initial Sludge ppt. | Metal Sulfides | Metal Sulfides | — |
| % $Na^+$ | 14 | 19 | +35.7 increase |
| % K | None | 1.7 | — |
| % Ni (from corrosion) | 1.0 | 3.8 | 280 increase |
| % CO(II) (from formulation) | 160 ppm | 71 ppm | — |
| % S° | 6.4 | 8.1 | +21.0 increase |
| % $SO_4$ | 23.0 | 27 | +17.4 increase |
| Secondary ppt. | White needlelike crystals x-ray $Na_2SO_4$ (massive | None | |

| ANALYSIS OF LIQUOR ANALYSIS (Filtrate) | | |
|---|---|---|
| Standard 35% NaHSO₃ | 9:1 Mole Na⁺/K⁺ Modified 35% NaHSO₃ | Differences Between Standard and 9:1 mole Na⁺/K⁺ Systems Relative % |
| (quantities) | | |

As can be observed from the result presented in Tables B and D, by incorporating a relatively small amount of potassium into a liquid sodium bisulfite oxygen scavenger formulation, it was indeed quite possible to significantly increase the amount of sodium sulfate retained in solution, thereby inhibiting precipitation and eliminating the problems of sodium sulfate precipitation within storage and feeding systems used for the sulfur-based reducing agent containing aqueous oxygen scavenger formulations.

Additional tests were done to attempt to determine the effect of cobalt (II) on the sodium bisulfite disproportionation reaction. Formulas were made up with and without cobalt, which formulas contained a standard oxygen-scavenging formulation having 35 percent active sodium bisulfite. These formulations were then heated to 120° F., or retained at ambient temperatures for a period of 3-4 weeks. The initial pH and final pH were measured, along with the final concentration of active sodium bisulfite. The results were presented in the following table.

| EFFECT OF CO(II) ppt ON NaHSO₃ DISPROPORTIONATION | | | | | | |
|---|---|---|---|---|---|---|
| | | pH | | | % NaHSO₃ | |
| | | 3-4 Weeks | | Theo- | 3-4 Weeks | |
| Formula Type | As Made | RT | 120° F. | retical | RT | 120° F. |
| No Cobalt | 4.64 | 4.58 | 4.53 | 35 | 34.5 | 34.4 |
| With Cobalt (ppt) | 4.61 | 3.18 | — | 35 | 26.0 | |

In addition, precipitates were formed depending on initial formula pH, in the presence of cobalt (II). At pH 3.8, no precipitates were formed even in the presence of cobalt for at least two weeks. At pH 4.1, precipitates were formed at room temperature at about 10 days; and in about seven days, at 120° F. At pH 4.3, precipitates were observed at room temperature in about two days. At pH 4.5, precipitates were observed within hours at room temperature storage.

There are many ways in which to achieve the replacement of sodium values with potassium values in the above described invention. One option would be to simply add the potassium salt of the chosen sulfur-based reducing agent to the sodium salt formulation.

Another option could include pH adjustment of, for example, sodium bisulfite solutions with potassium hydroxide to achieve a potassium-containing formulation having admixtures of bisulfite and sulfite reducing agents. Na/K bisulfite solutions can be made by reacting $SO_2$ with controlled blends of NaOH and KOH mixtures to make Na/KHSO₃. Other processes within the skill of the artisan could also be used, such as simple admixture of various potassium salts with sodium sulfite, bisulfite, etc., salt solutions.

Finally, an analysis of deposits found in feed systems of industrial boilers operating in the Midwest are presented in the following table.

| | PRECIPITATE ANALYSIS | | |
|---|---|---|---|
| POSITION DEPOSIT | | | NEAR CHECK |
| COLOR DEPOSIT | MID QUILL BLACK | BLACK WITH YELLOW FLECKS | NON BLACK (BLUE/PINK) |
| ANALYSIS | | | |
| S (SO₃) | 86% | 89 | 49 |
| NA (NAO) | 5 | 3 | 15 |
| CO (CO₃O₄) | 3 | 3 | 11 |
| FE (FE₂O₃) | 3 | 2 | 18 |
| NI (NIO) | 2 | 2 | 7 |
| X-RAY DIFFRACTION | S°, (FE, NI)S₂ | S°, (FE, NI)S₂ | NASO₄, NA₃FE(SO₄)₃, COSO₄.4 H₂O |

The deposits were found primarily blocking the feed quill at a location in the feeding and storage system exposed to high temperatures. The deposits contained cobalt and iron salts and high sulfur values, primarily sulfides, sulfur and sodium sulfate salts. The deposits had been formed after routine use of a commercial formulation of sodium sulfite oxygen scavenger catalyzed by a normally effective catalytic amount of cobalt II water-soluble salts.

After these deposits were analyzed, they were removed and a formulation containing between 8:1 and 10:1 mole ratio of sodium-to-potassium bisulfite and a comparable amount of cobalt catalysts were subsequently used in this system.

The industrial system has operated continually without difficulty for more than six months.

Having described my invention, I claim:

1. A method of inhibiting sodium sulfate salt precipitates in storage tanks, feed lines, pumps, valves, and feed quills exposed to concentrated aqueous oxygen scavenger formulations containing sulfur-based reducing agents chosen from the group consisting of sodium sulfite, sodium bisulfite, sodium metabisulfite, sodium hydrosulfite, and mixtures thereof, which comprises substituting potassium for a portion of the sodium present in said oxygen scavenger formulations, to provide a sodium to potassium mole ratio within the range of 1:1 to 15:1 thereby inhibiting sodium sulfate precipitation.

2. The method of claim 1 wherein the sodium-to-potassium mole ratio is between 8:1 to 10:1.

3. The method of claim 1 wherein the oxygen-scavenging formulations additionally contain catalytically effective amounts of cobalt salts and have a pH ranging between about 3.0 to about 5.0.

* * * * *